(12) United States Patent
Xu

(10) Patent No.: US 10,175,517 B2
(45) Date of Patent: Jan. 8, 2019

(54) DISPLAY DEVICE

(71) Applicant: Sharp Kabushiki Kaisha, Osaka (JP)

(72) Inventor: Qingle Xu, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/527,116

(22) PCT Filed: Nov. 20, 2015

(86) PCT No.: PCT/JP2015/082766
§ 371 (c)(1),
(2) Date: May 16, 2017

(87) PCT Pub. No.: WO2016/084750
PCT Pub. Date: Jun. 2, 2016

(65) Prior Publication Data
US 2017/0336668 A1  Nov. 23, 2017

(30) Foreign Application Priority Data
Nov. 25, 2015  (JP) ................................ 2014-237718

(51) Int. Cl.
*G02F 1/1333* (2006.01)
*G02F 1/1335* (2006.01)
*G09F 9/00* (2006.01)

(52) U.S. Cl.
CPC ...... *G02F 1/133308* (2013.01); *G02F 1/1333* (2013.01); *G02F 1/1335* (2013.01); *G02F 2001/13332* (2013.01); *G02F 2001/133314* (2013.01); *G02F 2201/08* (2013.01); *G09F 9/00* (2013.01)

(58) Field of Classification Search
CPC ... G02F 1/133308; G02F 2001/133314; G02F 2201/08
See application file for complete search history.

(56) References Cited

U.S. PATENT DOCUMENTS

| 5,739,880 | A | 4/1998 | Suzuki et al. | |
|---|---|---|---|---|
| 2013/0107162 | A1* | 5/2013 | Choi | G02B 6/0088 349/58 |
| 2013/0293804 | A1* | 11/2013 | Kim | G02F 1/133308 349/58 |
| 2014/0355304 | A1 | 12/2014 | Ikuta et al. | |

FOREIGN PATENT DOCUMENTS

| JP | 5-72531 A | 3/1993 |
|---|---|---|
| JP | H9-211473 A | 8/1997 |
| JP | 11-133404 A | 5/1999 |
| JP | 2007-26842 A | 2/2007 |
| JP | 2008-203875 A | 9/2008 |
| JP | 2009-301912 A | 12/2009 |
| JP | 2013-175301 A | 9/2013 |

\* cited by examiner

*Primary Examiner* — Dung Nguyen
(74) *Attorney, Agent, or Firm* — ScienBiziP, P.C.

(57) ABSTRACT

A display device according to one aspect of the present invention includes a liquid crystal panel having light-absorbing properties on at least one portion of an outer peripheral surface, an illumination device illuminating the liquid crystal panel with light, a first frame supporting the liquid crystal panel and illumination device and having light-absorbing properties, a liquid crystal panel, and a second friend housing the illumination device and first frame and having light-absorbing properties on at least a portion of a surface facing the first frame.

8 Claims, 5 Drawing Sheets

DISPLAY DEVICE

TECHNICAL FIELD

The present invention relates to a display device.

This application claims the benefit of Japanese Patent Application No. 2012-237718, filed in Japan on Nov. 25, 2014, which is hereby incorporated by reference in its entirety.

BACKGROUND ART

A transmissive liquid crystal display device has a liquid crystal panel and a backlight for illuminating the liquid crystal panel. The miniaturization of electronic devices has been progressing in recent years, and the non-display area on the periphery of the display device is tending to be narrower. In the explanation below, the non-display area on the periphery of the display device is referred to as the "frame region."

In such a liquid crystal display device, if light radiated from the backlight leaks into the non-display area of the liquid crystal panel periphery, problems occur such as a drop in display quality, a drop in light usage efficiency, and the like. To address this, Patent Documents 1 and 2 propose a liquid crystal display device equipped with a light-blocking tape in order to block leaked light such as that described above.

Conventional liquid crystal display devices have a frame supporting the liquid crystal panel and backlight, and the liquid crystal panel is supported on a step of the frame. The light-blocking tape is disposed between the liquid crystal panel and the step and is colored black in order to enhance the light-blocking effect.

RELATED ART DOCUMENTS

Patent Documents

Patent Document 1: Japanese Patent Application Laid-Open Publication No. H9-211473
Patent Document 2: Japanese Patent Application Laid-Open Publication No. 2009-301912

SUMMARY OF THE INVENTION

Problems to be Solved by the Invention

When the width of the frame region of the liquid crystal display device was wide, light-blocking methods such as the conventional one did not have any particular problems.

However, the narrowing of the frame region of the display device decreases the dimensions from the edge of the liquid crystal panel to the edge of the frame, which makes it hard to secure the necessary space for attaching the light-blocking tape.

Furthermore, thinning and weight reduction of liquid crystal panels has led to a decrease in the thickness of the glass substrates of the liquid crystal panel. As a result, during rework of the panel, it is exceptionally difficult and time-consuming to tear off the light-blocking tape in a manner that does not crack the glass substrate of the liquid crystal panel. The thinner the glass substrate becomes, the more susceptible the glass substrate is to cracking when the light-blocking tape is torn off. If the light-blocking tape is not used, however, light from the backlight will leak from the spaces between the components and from the end faces of the liquid crystal panel and significantly affect display quality of the liquid crystal display device.

One aspect of the present invention was made in view of the above-mentioned problems with the conventional technology and aims at making it possible to provide a display device having a narrow frame without a significant drop in display quality at the periphery of the display screen.

Means for Solving the Problems

In order to achieve the above-mentioned aim, a display device in one aspect of the present invention includes: a liquid crystal panel imparted with light-absorbing properties on at least one of end faces on a periphery thereof; an illumination device illuminating the liquid crystal panel with light; a first frame supporting the liquid crystal panel and the illumination device and having light-absorbing properties; and a second frame housing the liquid crystal panel, the illumination device, and the first frame, and being imparted with light-absorbing properties on at least a portion of a surface of the second frame facing the first frame.

In the display device in one aspect of the present invention, an adhesive member for securing the first frame may be disposed on the surface of the second frame.

In the display device in one aspect of the present invention, a first film made of a light-absorbing coating material may be disposed on the surface of the second frame.

In the display device in one aspect of the present invention, a second film made of a light-absorbing coating material may be disposed on the at least one of end faces of the liquid crystal panel.

In the display device in one aspect of the present invention, the light-absorbing coating material may be a resin material.

In the display device in one aspect of the present invention, the first frame may be made of a resin material having light-absorbing properties.

In the display device in one aspect of the present invention, the resin material may be a black color.

Effects of the Invention

A display device of one aspect of the present invention has a narrow frame without a significant drop in display quality at the periphery of the display screen.

DETAILED DESCRIPTION OF EMBODIMENTS

Figure 1:
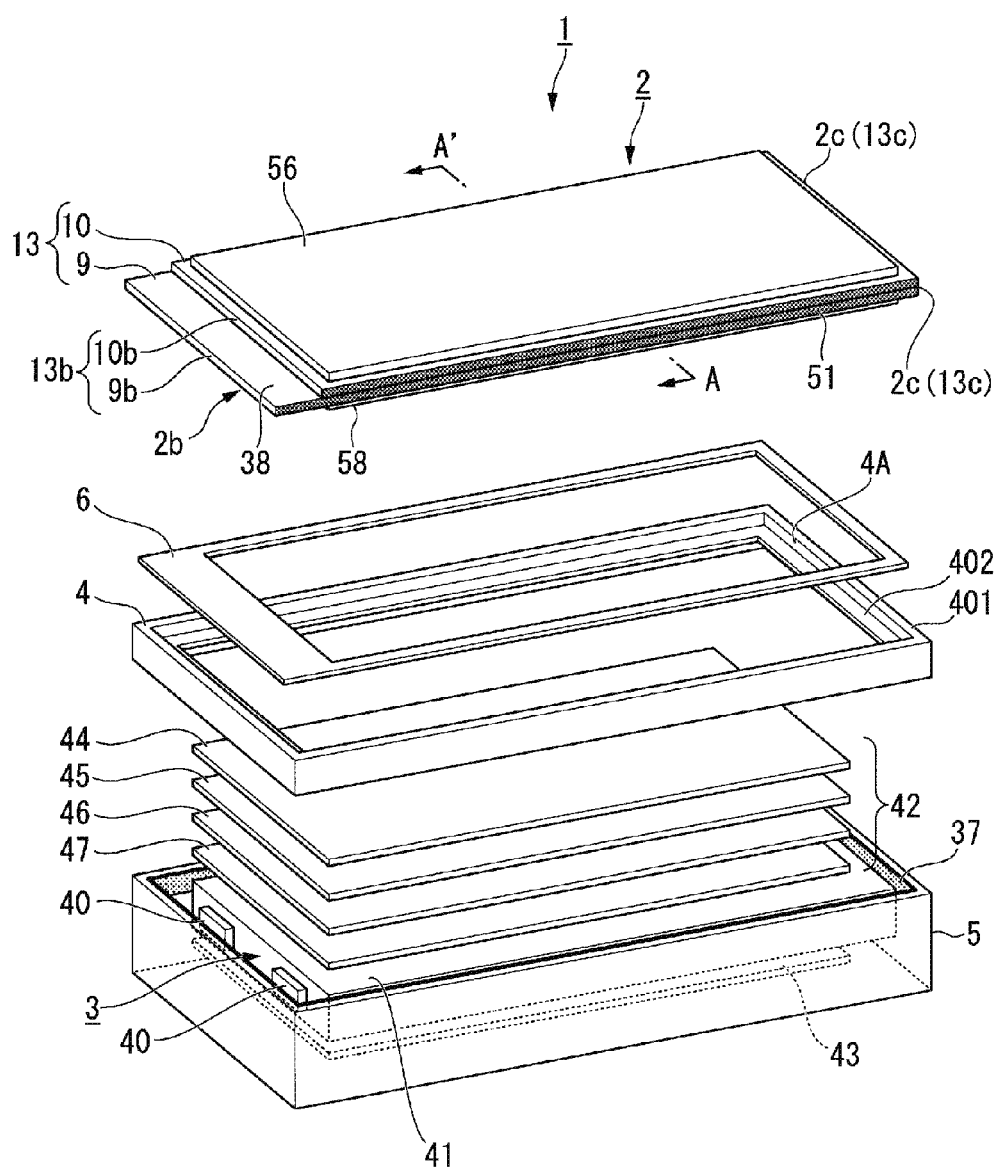
FIG. 1 is an exploded perspective view of the entire configuration of the liquid crystal display device of the present embodiment.

Embodiments of the present invention will be explained below with reference to the drawings. It should be noted that, in the drawings used in the explanations below, the scale of the members has been appropriately modified to a size that is easily recognizable.

[Liquid Crystal Device]

Figure 2:
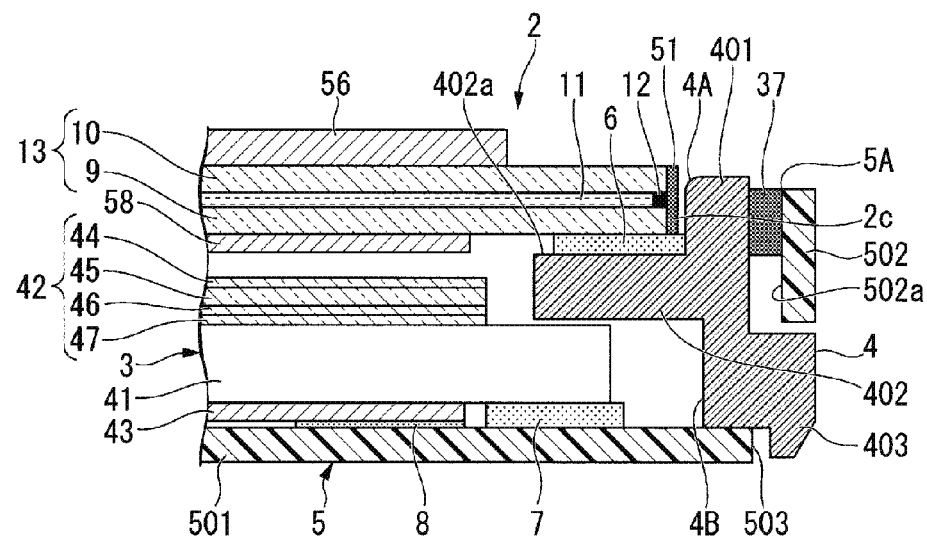
FIG. 2 is a partial cross-sectional view of the schematic configuration of the liquid crystal display device of the present embodiment.
Figure 3:
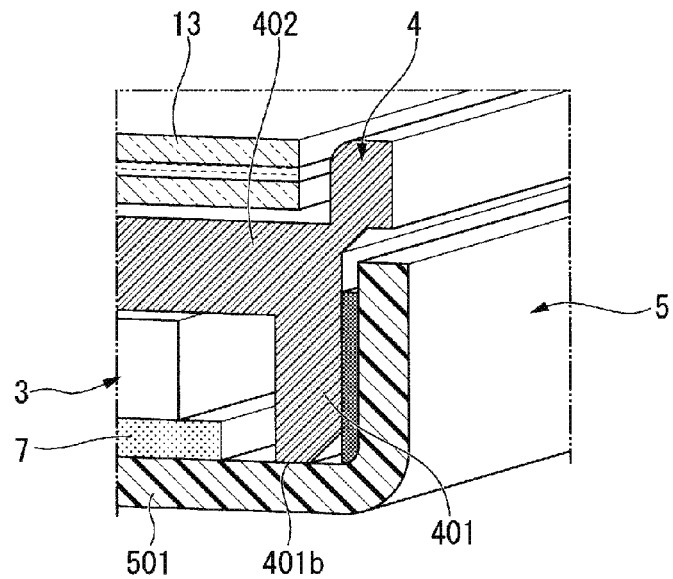
FIG. 3 is a perspective view of a partial cross section of a chassis except for a locking section.

FIG. 1 is an exploded perspective view of the entire configuration of the liquid crystal display device of the present embodiment. FIG. 2 is a partial cross-sectional view of the schematic configuration of the liquid crystal display device of the present embodiment. FIG. 3 is a perspective view of a partial cross section of a chassis except for a locking section.

<Liquid Crystal Display Device>

As shown in FIGS. 1 and 2, the liquid crystal display device (display device) of the present embodiment includes a liquid crystal panel 2, backlight (illumination device) 3, chassis (first frame) 4, bezel (second frame) 5, panel bonding tape 6, first adhesive 7, and second adhesive 8.

The backlight 3 is disposed on the bottom side of the liquid crystal panel 2 in FIG. 1. The backlight 3 emits light that illuminates the liquid crystal panel 2.

The chassis 4 supports the liquid crystal panel 2 and backlight 3. The bezel 5 houses the liquid crystal panel 2, backlight 3, and chassis 4.

The panel bonding tape 6 bonds the liquid crystal panel 2 to the chassis 4. The first adhesive 7 adheres the backlight 3 to the bezel 5, and the second adhesive 8 adheres a reflective plate 43 to the bezel 5.

In the liquid crystal display device 1, the light emitted from the backlight 3 is modulated for each pixel in the liquid crystal panel 2, and the light thus modulated for each pixel displays prescribed images, letters, or the like. The viewer views the display from the top side of the liquid crystal display device 1 in FIG. 1. In the explanation below, the top side of the liquid crystal display device 1 is referred to as the viewing side or front side, and the bottom side of the liquid crystal display device 1 (the side where the backlight 3 is disposed) is referred to as the rear side.

The liquid crystal panel 2 is constituted by a first polarizing plate 56, a first retardation plate (not shown in FIG. 1), a liquid crystal cell 13, a second retardation plate (not shown in FIG. 1), and a second polarizing plate 58. The panel bonding tape 6 has a rectangular shape with an opening at the display area in the center of the liquid crystal panel 2. In a similar manner to the panel bonding tape 6, the chassis 4 has a rectangular shape with an opening at the display area in the center of the liquid crystal panel 2. The bezel 5 has a box shape that can house the chassis 4, backlight 3, and the like.

As shown in FIGS. 1 and 2, the backlight 3 is constituted by light sources 40, a light guide plate 41, an optical sheet group 42, and the reflective plate 43. Light-emitting diodes (LEDs) are used as the light sources 40, for example. Cold cathode fluorescent tubes may also be used as the light sources. The light guide plate 41 is a transparent plate member that internally propagates light. The light guide plate 41 is made of an acrylic plate, for example. The light guide plate 41 is fixed to the bottom surface of the bezel 5 by the first adhesive 7. The light sources 40 are attached to the end face of the light guide plate 41 with the light-emitting face of the light sources facing the light guide plate 41. The light emitted from the light sources 40 enters from the end face of the light guide plate 41, is propagated and reflected inside the light guide plate 41, and is then emitted from the front surface of the light guide plate.

The reflective plate 43 is disposed on the rear surface side of the light guide plate 41. The reflective plate 43 is attached to the bottom surface of the bezel 5 by the second adhesive 8.

The reflective plate 43 is constituted by a plate member having a metal with high light reflectivity such as silver or aluminum deposited on one surface thereof, for example. The reflective plate 43 functions to reflect light that has reached the rear surface side of the light guide plate 41 toward the liquid crystal panel 2.

In the present embodiment, the optical sheet group 42 is constituted by four reflective sheets 44, 45, 46, and 47. The four reflective sheets 44, 45, 46, and 47 include two prism sheets, diffusion sheets, or the like that are arranged such that the light-focusing direction of each is orthogonal to one another, for example. These optical sheets 44, 45, 46, and 47 functions to adjust the diffusion properties of the light emitted from the light guide plate 41; to make the brightness in the surface of the light guide plate 41 uniform; and the like.

The chassis 4 has a frame 401 formed in a frame-like shape, an inside step 402 disposed on inside of the frame 401, and a locking section 403 disposed on the outside of the frame 401. The chassis 4 is made of plastic, for example. The inside step 402 is formed across the entire inner periphery of the frame 401. Meanwhile, the locking section 403 is for locking the chassis 4 to the bezel 5 by engaging an engaging hole 503 in the bezel 5. Thus, the locking section 403 is disposed on a portion of the outer periphery of the frame 401.

As shown in FIG. 3, at portions of the chassis 4 other than the locking section 403, a bottom end face 401b of the frame 401 abuts a bottom 501 of the bezel 5. The bottom portion of the chassis 4 has undergone a chamfering process in order to make insertion into the bezel 5 easier.

As shown in FIG. 2, the chassis 4 supports the liquid crystal panel 2 fitted into a top opening 4A side via the inside step 402 and houses the backlight 3 in a bottom opening side 4B in the chassis 4. The liquid crystal panel 2 is adhered to the chassis 4 by the panel bonding tape 6 disposed on a top surface 402a of the inside step 402.

The bezel 5 is constituted by a bottom 501 and a wall 502 and has a box-like shape with an opening 5A in one surface side and the bottom 501 on the other surface side. The bezel 5 is made of a metal such as aluminum, for example. The bezel 5 has disposed thereon a light-blocking adhesive tape (adhesive member) 37 for fixing the chassis 4 to the inner surface (the surface) 502a of the wall 502. This light-blocking adhesive tape 37 prevents play or the like between the bezel 5 and the chassis 4. It is preferable that the bezel 5 be made of a material that is not light transmissive.

(Liquid Crystal Panel)

A specific configuration of the liquid crystal panel 2 will be described below with reference to FIGS. 4 and 5.

Figure 4:
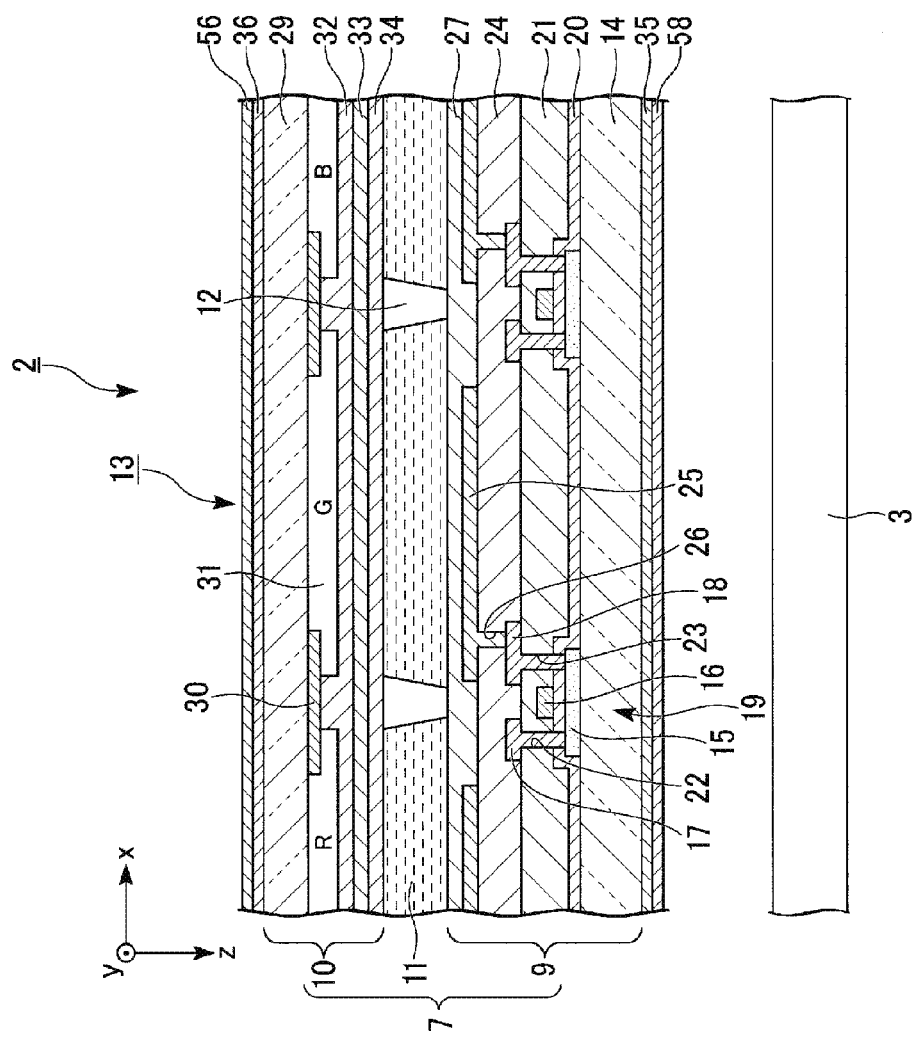
FIG. 4 is a cross-sectional view of a specific configuration of the liquid crystal panel.

FIG. 4 is a cross-sectional view of a specific configuration of the liquid crystal panel. FIG. 5 is a front view of a state in which a flexible substrate is connected to the liquid crystal panel.

Although the explanation below takes as an example an active matrix transmissive liquid crystal, the liquid crystal panels to which the present invention can be applied are not limited to active matrix transmissive liquid crystal panels. The liquid crystal panel 2 applicable to the present invention may be a transflective (transmissive and reflective) liquid crystal panel, or a simple matrix liquid crystal panel in which the pixels are not provided with thin film transistors (hereinafter, TFTs) for switching, for example.

The liquid crystal cell 13 constituting a portion of the liquid crystal panel 2 has a TFT substrate 9 as a switching device substrate, a color filter substrate 10 disposed facing the TFT substrate 9, and a liquid crystal layer 11 held between the TFT substrate 9 and the color filter substrate 10. The liquid crystal layer 11 is sealed within a space surrounded by the TFT substrate 9, color filter substrate 10, and a frame-shaped sealing material (not shown) that attaches the TFT substrate 9 and color filter substrate 10 together with a prescribed gap therebetween.

The liquid crystal cell 13 of the present embodiment performs display in the vertical alignment (VA) mode, for example. The liquid crystal layer 11 uses liquid crystal with a negative dielectric anisotropy. Columnar spacers 12 are arranged between the TFT substrate 9 and the color filter substrate 10. The spacers 12 keep the gap between these substrates uniform. The spacers 12 are made of resin, for example, and formed via photolithography technology.

The second polarizing plate 58, which functions as a polarizer, is disposed on the backlight 3 side of the liquid crystal cell 13. The first polarizing plate 56, which functions as an analyzer, is disposed on viewing side of the liquid crystal cell 13. A second retardation plate 35 for compensating the phase difference of light is disposed between the second polarizing plate 58 and the liquid crystal cell 13. In a similar manner, a first retardation plate 36 for compensating the phase difference of light is disposed between the first polarizing plate 56 and the liquid crystal cell 13.

Sub-pixels, which represent the minimum area of display, are arranged in a plurality in a matrix pattern on the TFT substrate 9. A plurality of source bus lines (not shown) are formed extending parallel to one another on the TFT substrate 9. A plurality of gate bus lines (not shown) are formed extending parallel to one another and perpendicular to the plurality of source bus lines on the TFT substrate 9. The plurality of source bus lines and plurality of gate bus lines are formed in a grid pattern on the TFT substrate 9.

The rectangular regions demarcated by the source bus lines and gate bus lines each forms a single sub-pixel. The source bus lines are connected to source electrodes of the TFTs (described later), and the gate bus lines are connected to gate electrodes of the TFTs.

TFTs 19 each having a semiconductor layer 15, gate electrode 16, source electrode 17, drain electrode 18, and the like are formed on the liquid crystal layer 11 side of a transparent substrate 14 constituting the TFT substrate 9. A glass substrate can be used as the transparent substrate 14, for example. A semiconductor layer 15 made of a semiconductor material such as CGS (continuous grain silicon), LPS (low-temperature poly-silicon), or a-Si (amorphous silicon) is formed on the transparent substrate 14, for example.

A gate insulating film 20 is formed on the transparent substrate 14 so as to cover the semiconductor layer 15. The material of the gate insulating film 20 is a silicon oxide film, a silicon nitride film, a multilayer film of these, or the like, for example. A gate electrode 16 is formed on the gate insulating film 20 and faces the semiconductor layer 15. The material of the gate electrode 16 is multilayer film of W (tungsten)/TaN (nitride tantalum), or Mo (molybdenum), Ti (titanium), Al (aluminum), or the like, for example.

A first interlayer insulating film 21 is formed on the gate insulating film 20 so as to cover the gate electrode 16. The material of the first interlayer insulating film 21 is a silicon oxide film, a silicon nitride film, a multilayer film of these, or the like, for example. The source electrode 17 and drain electrode 18 are formed on the first interlayer insulating film 21. The source electrode 17 is connected to the source region of the semiconductor layer 15 via a contact hole 22 that penetrates the first interlayer insulating film 21 and gate insulating film 20.

In a similar manner, the drain electrode 18 is connected to the drain region of the semiconductor layer 15 via a contact hole 23 that penetrates the first interlayer insulating film 21 and gate insulating film 20. The material of the source electrode 17 and drain electrode 18 is the same conductive material as the gate electrode 16 described above. A second interlayer insulating film 24 is formed on the first interlayer insulating film 21 so as to cover the source electrode 17 and drain electrode 18. The material of the second interlayer insulating film 24 is the same material as the first interlayer insulating film 21 described above, or an organic insulating material.

A pixel electrode 25 is formed on the second interlayer insulating film 24. The pixel electrode 25 is connected to the drain electrode 18 via a contact hole 26 that penetrates the second interlayer insulating film 24. Accordingly, the pixel electrode 25 is connected to the drain region of the semiconductor layer 15 with the drain electrode 18 as a relay electrode. The material of the pixel electrode 25 is a transparent conductive material such as ITO (indium tin oxide), IZO (indium zinc oxide), or the like, for example.

Due to this configuration, the TFT 19 turns ON when a scan signal is supplied to the gate electrode 16 through the gate bus line. At such time, the image signal supplied to the source electrode 17 through the source bus line is supplied to the pixel electrode 25 via the semiconductor layer 15 and drain electrode 18.

The TFT may be the top gate-type TFT shown in FIG. 4, or may a bottom gate-type TFT.

Meanwhile, a black matrix 30, color filter 31, planarizing layer 32, opposite electrode 33, and alignment film 34 are sequentially formed on the surface of a transparent substrate 29 constituting the color filter substrate 10 on the liquid crystal layer 11 side. The black matrix 30 functions to block light from passing through the areas between the pixels and is made of a metal such as chromium (Cr) or a multilayer film such as Cr/chromium oxide or a photoresist in which carbon particles have been diffused into a photosensitive resin.

The color filter 31 includes pigments of red (R), green (G), blue (B), and each pixel electrode 25 on the TFT substrate 9 has either a R, G, or B color filter 31 facing the pixel electrode. The area where the R, G, or B color filter 31 is disposed constitutes a sub-pixel. Three sub-pixels of R, G, and B constitute one pixel.

The planarizing layer 32 is made of an insulating film covering the black matrix 30 and the color filter 31, and functions to smooth and flatten steps caused by the black matrix 30 and color filter 31. The opposite electrode 33 is formed on the planarizing layer 32. In a similar manner to the pixel electrode 25, the material of the opposite electrode 33 is a transparent conductive material. The color filter 31 may be a multicolor configuration of three colors, R, G, B, or more.

On the TFT substrate 9, the alignment film 27 is formed on the entire surface over the second interlayer insulating film 24 in order to cover the pixel electrode 25. On the color filter substrate 10, the alignment film 34 is formed on the entire surface covering the opposite electrode 33. The alignment film 27 and alignment film 34 have an alignment regulating force that causes liquid crystal molecules 11B constituting the liquid crystal layer 11 to be vertically aligned. The alignment film 27 and alignment film 34 are so-called vertical alignment films. In the present embodiment, a VA mode was adopted for the liquid crystal cell 13, but the liquid crystal cell is not limited to this and may be a twisted nematic (TN) mode, IPS, or lateral electrode field mode such as FFS.

Figure 5:
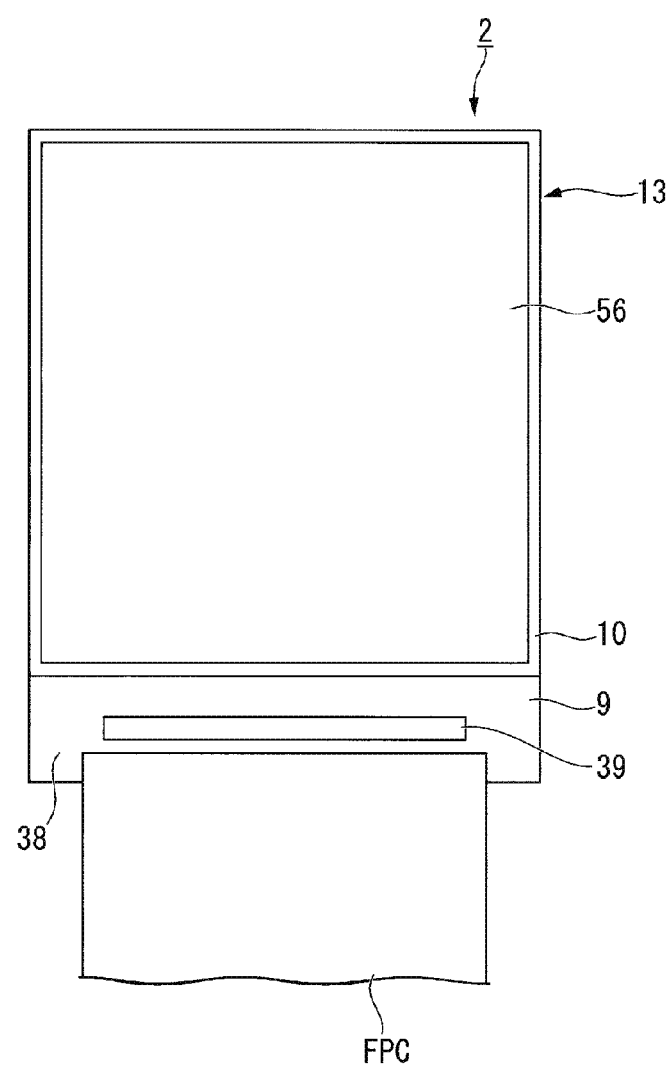
FIG. 5 is a front view of a state in which a flexible substrate is connected to the liquid crystal panel.

As shown in FIG. 5, the TFT substrate 9 of the liquid crystal panel 2 has an area 38 not facing the color filter substrate 10, and a driver IC 39 or the like is mounted on this area 38 as a control circuit that generates signals for controlling each pixel. A flexible substrate (FPC) electrically connecting this driver IC 39 to an external driver circuit is electrically connected by an anisotropic conductive film (ACF) or the like, for example.

Characteristics of the liquid crystal display device of the present embodiment will be described below.

First, as shown in FIGS. 1 and 2, the present embodiment is characterized in imparting light-absorbing properties to end faces 2c of the liquid crystal panel 2. Specifically, a light-blocking film (second film) 51 made of a light-absorbing coating material is disposed on the three end faces 2c except for the end face 2b on the side where the flexible substrate (FPC) connects to the liquid crystal panel 2.

Examples of the light-absorbing coating material include a black resin material having properties that allow the material to absorb light from the backlight 3.

In the present embodiment, the end faces 2c of the liquid crystal panel 2 correspond to end faces 13c of the liquid crystal cell 13. Furthermore, the end face 2b on the flexible substrate (FPC) side of the liquid crystal panel 2 corresponds to the end face 13b of the liquid crystal cell 13.

When forming the light-blocking film 51, the light-absorbing coating material is ordinarily coated on the three end faces 13c of the liquid crystal cell 13 at the same time. The liquid crystal cell 13, however, is made of the color filter substrate 10 and TFT substrate 9, which have glass substrates that differ in size from each other. Therefore, the positions of the end faces 10b and 9b on the flexible substrate (FPC) side do not coincide with each other, and while it takes slightly more coating work, the light-absorbing coating material can also be coated on these end faces 10b and 9b to form the light-blocking film 51.

In the present embodiment, however, the light-blocking film 51 is not provided on this end face 13b of the liquid crystal cell 13.

Regardless, the present invention is not limited to this, and the light-blocking film 51 may be formed on the end face 10b of the color filter substrate 10 constituting the liquid crystal cell 13.

Furthermore, the present embodiment is characterized by the chassis 4 that supports the liquid crystal panel 2 and the backlight 3 having light-absorbing properties. Specifically, the entire chassis 4 is molded by a black resin material.

Moreover, a light-blocking adhesive tape 37 for fixing the chassis 4 to the bezel 5 is disposed on the inner surface 502a of the bezel 5 facing the chassis 4, and in the present embodiment this light-blocking adhesive tape 37 has light-absorbing properties. The light-blocking adhesive tape 37 is made of a tape member constituted by a black adhesive material.

The light-blocking adhesive tape 37 of the present embodiment is provided on an area of the wall 502 near the opening 5A, but is not restricted to this. The light-blocking adhesive tape 37 may be disposed so as to cover the entire inner surface 502a of the wall 502, for example. In other words, with respect to the wall 502 rising from the periphery of the bottom 501 of the bezel 5, the light-blocking adhesive tape 37 need only be disposed on at least a portion of the inner surface 502a facing the chassis 4. The light-blocking adhesive tape need not be disposed on the inner surface 502a on the side of the bezel 5 where the flexible substrate (FPC) exists, for example.

In the liquid crystal display device 1 described above, the light emitted from the backlight 3 diffuses at a certain angle. If this light leaks from the periphery of the liquid crystal panel 2 to outside, the display quality drops; thus, in conventional liquid crystal display devices, an adhesive tape (hereinafter, "light-blocking tape") that also had light-blocking properties was used as the panel adhesive tape for adhering the liquid crystal panel to the chassis. The narrowing of the frame region in modules, however, made it difficult to secure the necessary area for attaching the light-blocking tape.

As a countermeasure, in the liquid crystal display device 1 of the present embodiment, light-blocking properties are imparted to the end faces 2c of the liquid crystal panel 2, the chassis 4, and the inner surface 502a of the bezel 5.

First, the light-blocking film 51 disposed on at least the three end faces 2c of the liquid crystal panel 2 can block light leaking from the end faces of the liquid crystal panel 2.

Furthermore, in the present embodiment, forming the chassis 4 with a black light-absorbing resin imparts light-blocking properties to the entire chassis 4. Conventional chassis did not have light-absorbing properties, which resulted in light that had passed through the chassis leaking directly to outside, but the chassis 4 of the present embodiment, which has light-absorbing properties, can block light from the backlight 3 that leaks to outside.

It should be noted that the light absorptivity (light-blocking rate) of the chassis 4 will differ depending on the material used, but even if a slight amount of light passes through the chassis 4, the light-blocking adhesive tape 37 disposed on the inner surface 502a of the bezel 5 facing the chassis 4 can block this light.

In addition, FIG. 2 shows a cross section of a portion of the locking section 403 of the chassis 4, and if a gap partially exists between the chassis 4 and the bezel 5 in the direction of the sheet of paper, it is conceivable that light from the backlight 3 could leak from this gap. The light-blocking adhesive tape 37 described above would also be able to block this type of leaked light.

Due to this, it is possible to achieve a liquid crystal display device that has a narrow frame without a significant drop in display quality at the periphery of the display screen.

Moreover, the liquid crystal display device 1 of the present embodiment makes it unnecessary to use an expensive light-blocking tape for the panel bonding tape 6 that adheres the liquid crystal panel 2 to the chassis 4. Using an inexpensive bonding tape can lower costs. Furthermore, even if an ordinary adhesive tape were to be used instead of the light-blocking tape, the light-blocking structure of the present embodiment described above makes it possible to sufficiently suppress light leakage to outside without incurring extra cost.

Figure 6:
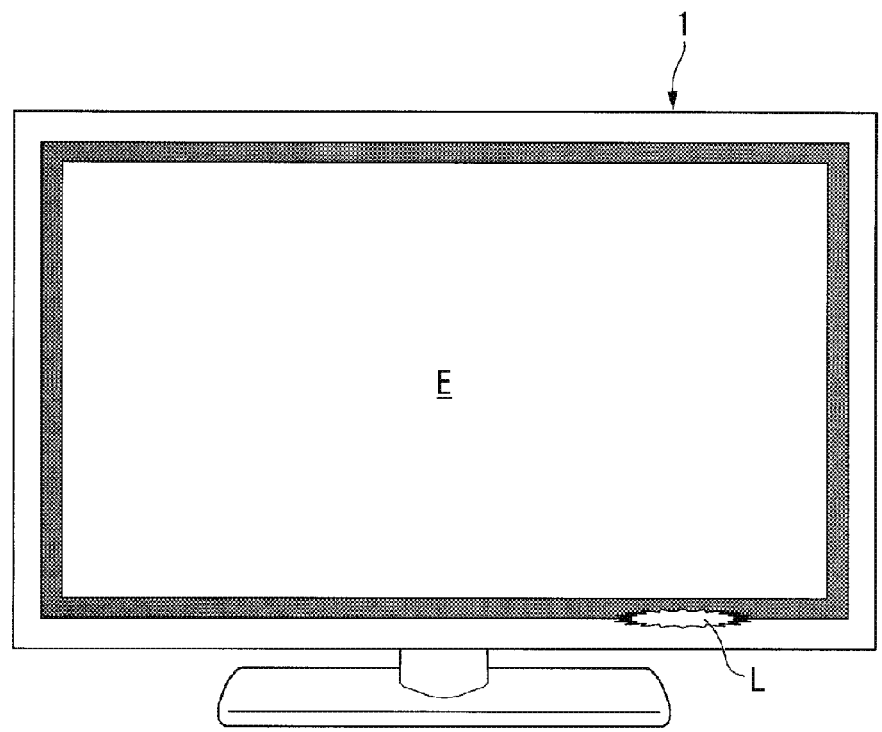
FIG. 6 is a view verifying the status of light leakage from the liquid crystal display device of the present embodiment.

The inventor of the present invention has in fact prototyped the liquid crystal display device 1 of the present embodiment described above and has indeed verified the status of light leakage from the liquid crystal display device 1. As shown in FIG. 6, when the liquid crystal display device 1 is viewed from the front direction while being driven, despite a slight amount of leaked light L being visible in a portion on the lower right area of the display area E, it was found that light leakage did not occur in other areas. The slight amount of light leakage that occurred could be attributed to positional deviations in the arrangement of the constituting members or the like and is easily correctable.

Preferable embodiments of the present invention were described above with reference to the appended drawings, but it goes without saying that the present invention is not limited to such examples. It is clear that a person skilled in the art could conceive of various types of changes or modifications within the scope of the technical spirit defined in the claims, and it is naturally understood that such changes or modifications would also be within the technical scope of the present invention. The configurations in the respective embodiments may be combined as appropriate.

Figure 7:
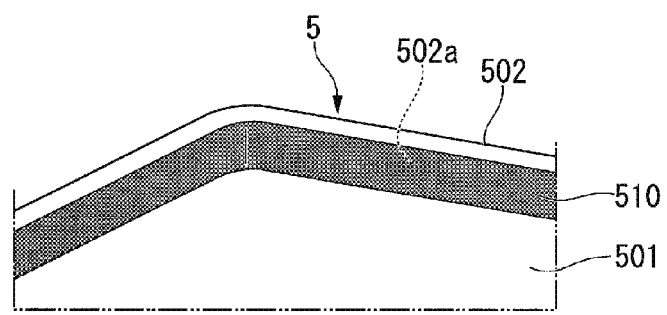
FIG. 7 is a view of a configuration example in which light-absorbing properties have been imparted to the entire inner surface of a bezel.

In the embodiment described above, for example, the light-blocking adhesive tape 37 was disposed between the bezel 5 and the chassis 4, but as shown in FIG. 7, a light-blocking film 510 may be disposed on the entire inner surface 502a of the bezel 5 facing the chassis 4. The light-blocking film 510 can be made by coating a black resin material with light-absorbing properties on the entire inner surface 502a of the bezel 5.

The color of the resin material for the material of the light-blocking adhesive tape 37, chassis 4, light-blocking film 51, and light-blocking film 510 is not limited to black. In addition to black, grey, or other dark colors, milky colors, or the like may be used, for example.

In addition to the inner surface coating described above, other methods can be used to form the light-blocking film 510 on the entire inner surface 502a. Specifically, a black film can be bonded to a plate-like metal plate via crimping, an adhesive agent, or the like, and this metal plate with the attached black film can be press molded etc. to form a bezel, for example.

INDUSTRIAL APPLICABILITY

One aspect of the present invention can be applied to display devices or the like where it is necessary to have a narrow frame without a significant drop in display quality at the periphery of the display screen.

DESCRIPTION OF REFERENCE CHARACTERS 1 liquid crystal display device (display device)
2 liquid crystal panel
2c end face
3 backlight (illumination device)
4 chassis (first frame)
5 bezel (second frame)
37 light-blocking adhesive tape (adhesive member)
51 light-blocking film (second film)
502a inner surface (surface)

What is claimed is:

1. A display device, comprising:
a liquid crystal panel imparted with light-absorbing properties on at least one of end faces on a periphery thereof;
an illumination device illuminating the liquid crystal panel with light;
a first frame supporting the liquid crystal panel and the illumination device and having light-absorbing properties; and
a second frame housing the liquid crystal panel, the illumination device, and the first frame, and being imparted with light-absorbing properties on at least a portion of a surface of the second frame facing the first frame,
wherein a first film made of a light-absorbing coating material is disposed on said surface of the second frame.

2. The display device according to claim 1, wherein the light-absorbing coating material is a resin material.

3. The display device according to claim 2, wherein the resin material has a black color.

4. The display device according to claim 1, wherein the first frame is made of a resin material having light-absorbing properties.

5. The display device according to claim 1, wherein a second film made of a light-absorbing coating material is disposed on said at least one of end faces of the liquid crystal panel.

6. The display device according to claim 5, wherein the light-absorbing coating material forming the first film and the light-absorbing coating material forming the second film are respectively resin materials.

7. The display device according to claim 1, wherein the first frame is made of a resin material having light-absorbing properties.

8. The display device according to claim 7, wherein the resin material has a black color.

* * * * *